(12) United States Patent  (10) Patent No.: US 9,087,248 B2
Kwan  (45) Date of Patent: Jul. 21, 2015

(54) METHOD, SYSTEM, AND APPARATUS FOR A MULTIPLE PATH IMAGE SCANNER

(75) Inventor: Sik Piu Kwan, Suwanee, GA (US)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 11/608,923

(22) Filed: Dec. 11, 2006

(65) Prior Publication Data

US 2008/0135619 A1   Jun. 12, 2008

(51) Int. Cl.
   *G06K 19/00*   (2006.01)
   *G06K 7/10*   (2006.01)

(52) U.S. Cl.
   CPC .......... *G06K 7/10722* (2013.01); *G06K 7/1096* (2013.01)

(58) Field of Classification Search
   USPC ............. 235/462.11, 462.14, 462.32, 462.36, 235/462.38, 462.39, 462.41
   See application file for complete search history.

(56) References Cited

U.S. PATENT DOCUMENTS

| 5,126,540 | A  | * | 6/1992  | Kashiwagi et al. | 235/375 |
| 5,886,336 | A  | * | 3/1999  | Tang et al.      | 235/462.43 |
| 6,112,857 | A  | * | 9/2000  | Morrison         | 186/61 |
| 6,631,845 | B2 | * | 10/2003 | Barkan           | 235/462.4 |
| 6,651,889 | B2 | * | 11/2003 | Belknap et al.   | 235/462.4 |
| 6,689,998 | B1 | * | 2/2004  | Bremer           | 250/201.2 |
| 6,728,015 | B2 | * | 4/2004  | Ohkawa et al.    | 359/216.1 |
| 6,840,453 | B2 | * | 1/2005  | Ohkawa           | 235/462.4 |
| 6,899,272 | B2 | * | 5/2005  | Krichever et al. | 235/462.37 |
| 2003/0111537 | A1 | * | 6/2003 | Tien           | 235/462.45 |
| 2005/0011952 | A1 | * | 1/2005 | Krichever       | 235/454 |
| 2005/0092843 | A1 | * | 5/2005 | Dowling et al.  | 235/472.01 |
| 2006/0113393 | A1 | * | 6/2006 | Herwig et al.   | 235/462.37 |
| 2007/0119946 | A1 | * | 5/2007 | Ishii et al.    | 235/462.32 |

* cited by examiner

*Primary Examiner* — Matthew Mikels
(74) *Attorney, Agent, or Firm* — Harden E. Stevens, III; Joseph P. Mehrle

(57) ABSTRACT

A apparatus, method, and system for reading an optical code using a multiple path image scanner. The image scanner captures a plurality of images using multiple optical image paths and a path directing device that directs the images to an image capture device. One or more of the captured images is then used to decode the optical code.

31 Claims, 3 Drawing Sheets

METHOD, SYSTEM, AND APPARATUS FOR A MULTIPLE PATH IMAGE SCANNER

TECHNICAL FIELD

The apparatus described herein relates generally to image scanners used to read optical codes.

BACKGROUND

Image scanners use charge coupled devices (CCD) or complementary metal oxide semiconductors (CMOS) based image capture devices to capture images of optical codes. Once captured, the images are then processed to decode optical codes. The image scanners have a limited depth and width of field for viewing the optical codes. Only optical codes that are properly oriented and located within the depth and width requirements of the image capture device can be captured with the clarity needed to decode the optical code. (Decoding an optical code from an image is referred to as reading the optical code.) An optical code that is either outside of the depth or width of field or not properly oriented to the image capture device will not be readable because a decodable image of the optical code cannot be captured. The depth and width of field is determined in large part by the optics used to direct the image onto the image capture device and the light available to illuminate the optical code.

Adding the ability to make focusing adjustments to the optics will allow the depth and width of field to vary but moving the optics takes time and the additional depth and width of field may not be sufficient to cover the required area. Plus, this approach does not address the situation where the optical code is not properly orientated to the optics or is in motion. Therefore, it is desirable to be able to increase the depth and width of field of the imaging device without increasing the capture time or sensitivity to movement while also being able to capture images of the optical code from many different angles.

DETAILED DESCRIPTION

In the following description, numerous details are set forth to provide an understanding of the invention. However, it will be understood by those skilled in the art that the invention may be practiced without these details and that numerous variations or modifications from the described embodiments are possible.

Figure 1:
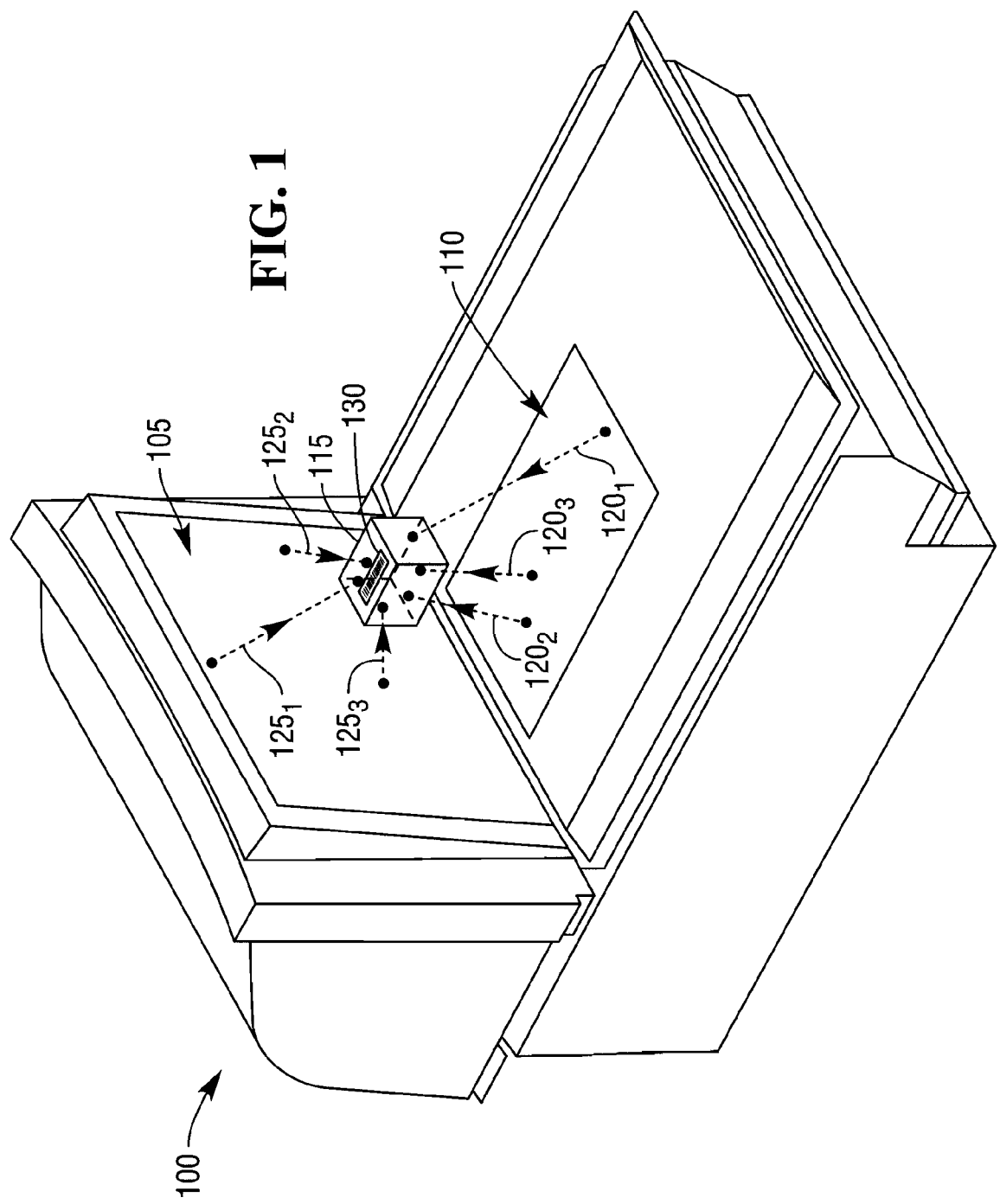
FIG. 1 is an illustration of one embodiment of a multiple path image scanner device.

Turning now to FIG. 1, there is provided an exemplary illustration of one embodiment of a multiple path image scanner device 100 used to scan optical codes. In this embodiment, a box 115 is moved over the horizontal scanning window 110 and in front of the vertical scanning window 105. The box 115 has an optical code 130 printed or applied on the top surface. In this embodiment, the optical code is a bar code 130. In other embodiments, the optical code can be other types of optical codes including text, numbers or symbols. Additionally, the optical codes can include a combination of two or more types of codes. An optical code can be placed on any surface of the box 115 and in any orientation. Additionally, a single side of the box 115 can have multiple optical codes.

The horizontal scanning window 110 is transparent allowing one or more optical image paths $120_{1-3}$ to extend from one or more focal planes above the horizontal scanning window 110 through the horizontal scanning window 110. The optical image paths $120_{1-3}$ extend generally in a vertical or upward direction through the horizontal scanning window 110. Some image paths form an acute angle with the horizontal scanning window 110 but are still described as generally extending upward or in a generally vertical direction from the horizontal scanning window 110 as long as they pass through the horizontal scanning window 110.

Similarly, the vertical scanning window 105 is transparent allowing one or more optical image paths $125_{1-3}$ to extend from one or more focal planes in front of the vertical scanning window 105 through the vertical scanning window. The optical image paths $125_{1-3}$ extend generally in a horizontal direction from the vertical scanning window 105. Some image paths form an acute angle with the vertical scanning window 115 but are still described as generally extending in a horizontal direction from the vertical scanning window 115 as long as they pass through the vertical scanning window 115.

Together, the six optical image paths $120_{1-3}$ and $125_{1-3}$ provide an image viewing path to each of the six sides of the box 115. The ability to images all six sides of the box 115 with one pass-by greatly improves the probability that a bar code located on any of the sides can be read on the first try. Other embodiments tailored for different applications incorporate additional optical image paths while still other embodiments have fewer optical image paths. Additionally, there is no requirement that an equal number of optical image paths pass through the vertical and horizontal windows. Some embodiments may have either a vertical or a horizontal scanning window but not both. In still other embodiments, more than two scanning windows are used.

Figure 2:
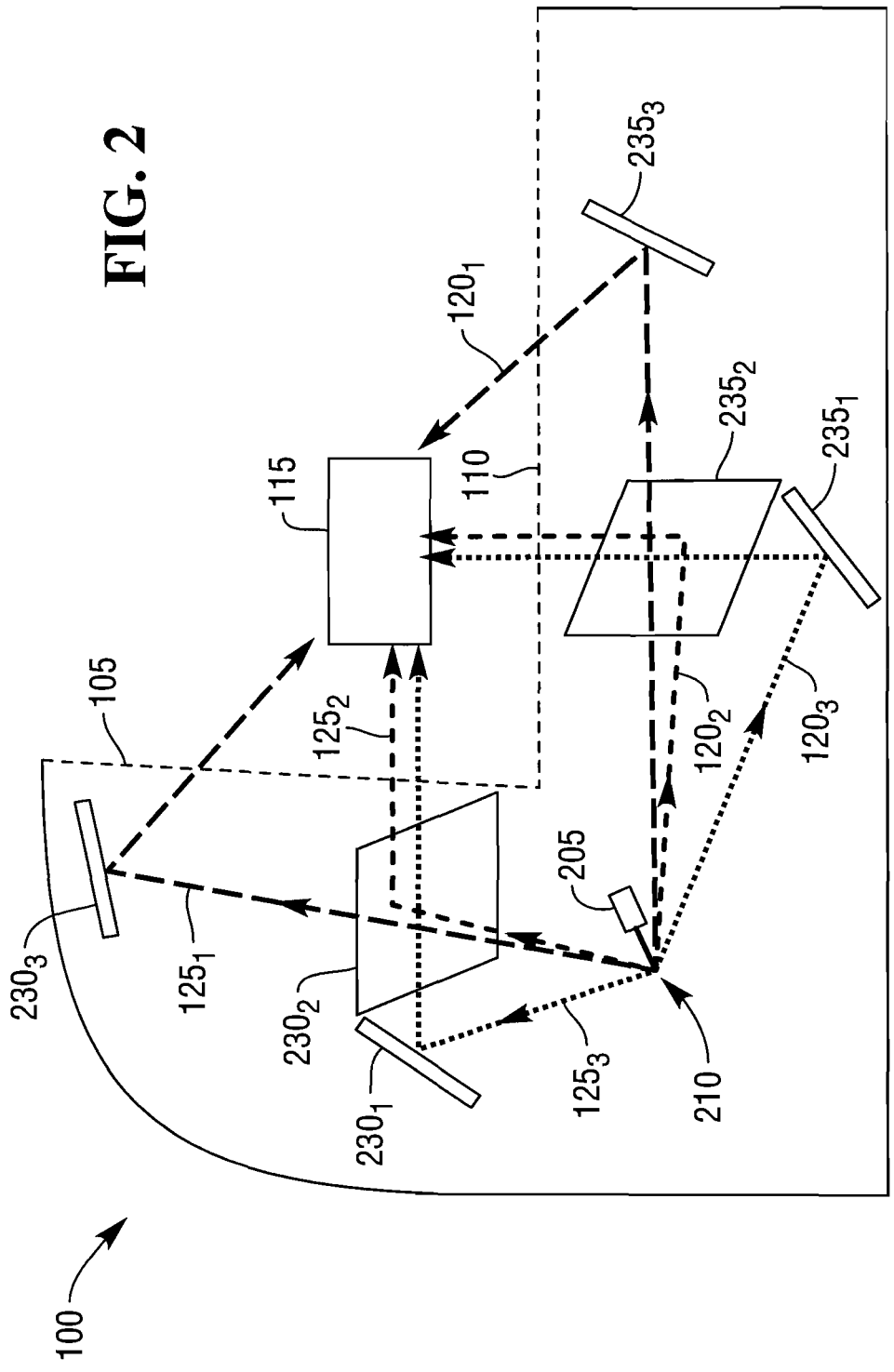
FIG. 2 is an illustration of a cross-section view of one embodiment of a multiple path imaging scanner device.

FIG. 2 illustrates a cross-section of the imaging scanner device 100. A path directing device 210 is used to direct each of the optical image paths $120_{1-3}$, $125_{1-3}$ to an image capture device 205. The path directing device 210 is a rotatable polygon. The sides of the path directing device 210 are optically reflective and geometrically aligned to direct one or more of the optical image paths $120_{1-3}$, $125_{1-3}$ to the image capture device 205. In other embodiments, not all the sides of the path directing device 210 are reflective. During each 360° rotation of the path directing device 210, each of the optical image paths $120_{1-3}$, $125_{1-3}$ are directed to the image capture device 205 by one or more sides of the path-directing device 210. In some embodiments, the reflective sides of the path directing device 210 not only direct the optical image paths but also provide a focusing function. In these embodiments, the reflective sides are concave or convex mirrors that direct and focus the optical image paths $120_{1-3}$, $125_{1-3}$ to the image capture device 205. In some embodiments, the path directing device 210 is a prism with sides that are concave or convex refracting surfaces that direct and focus the optical image paths $120_{1-3}$, $125_{1-3}$ to the image capture device 205. In still other embodiments, the path directing device 210 is a MEMS (Micro Electro-Mechanical System) device such as a micro mirror array that can by moving the micro mirrors direct the image paths.

In addition to the reflective surfaces on the path directing device 210, mirrors $230_{1-3}$ $235_{1-3}$ are aligned to further direct each optical image path from its focal plane to the path directing device 210. Mirrors $235_{1-3}$ are used to direct image paths $120_{1-3}$ through the horizontal scanning window 110 to the path directing device 210. Likewise, mirrors $230_{1-3}$ are used to direct optical image paths $125_{1-3}$ through the vertical scanning window 105 to the path directing device 210. In some embodiments, it is possible to both align and direct at least one image path using just the path directing device 210 with no additional mirrors. In some embodiments, the one or more of the mirrors $230_{1-3}$ $235_{1-3}$ are concave or convex mirrors aligned to direct and to focus an optical image path to the path directing device 210.

In some embodiments, focusing optics (not shown) are placed between the path directing device 210 and the image capture device 205. The focusing optics are one or more concave or convex lenses that focus the directed image paths on to the image capture device 205.

The six optical image paths $120_{1-3}$, $125_{1-3}$ are aligned to provide the image capture device 205 with a view of each of the six sides of the box 115, when box 115 is in the proper position. In other embodiments, one or more additional optical image paths are added to increase the depth or width of field. In some embodiments, multiple optical image paths are arranged to view the same side of the box 115. Having multiple optical image paths aligned to the same side increases the depth and/or the width of field on the side or sides of the box 115 that are viewed. In some cases, the optical image paths are aligned to view areas that are next to each other, thus increasing the width of field. In other cases, the optical image paths are aligned to view areas at different distances or angles, thus increasing the depth of field. In still other cases, additional optical image paths can accomplish increases in both depth and width of field. Increasing the depth and/or width of field increases the probability that one or more of the captured images will contain a decodable image of the optical code.

The image capture device 205 is designed to capture an image directed at it and then to transfer the image for additional processing and decoding of the optical code. A number of different technologies can be used to implement the image capture device 205. Two exemplary technologies are charge coupled devices (CCD) and a complementary metal oxide semiconductors (CMOS). Both technologies work by converting light to an electric charge. The electric charge is then process into electronic signals. The electronic signals are further processed to create a digital representation of the captured image. Each of the above technologies has advantages and tradeoffs and either can be made to function as the image capture device 205.

The rotation speed of the path directing device 210 is determined by the speed in which the image capture device 205 can capture an image or sometimes referred to as the exposure time of the image capture device 205. Typical laser based optical code scanners have path directing devices that rotate between 5,000 and 10,000 RPMs. Laser scanners use a simple light detection device (photodiode) tuned to the frequency of the laser to detect the reflected laser beam. However, the process of capturing an image requires more time than simply detecting the presence or absence of laser light. Therefore, the image must be directed at the image capture device 205 for a longer period of time thus requiring a slower rotation of the path-directing device 210. Depending on the technology used to implement the image capture device 205 and the maximum allowed relative moment (pass by speed) of the object being imaged, the rotation speed of the path directing device 210 will vary approximately between 500-720 RPMs. This assumes a maximum pass by speed of 72 inches per second for the optical code. The slower rotation speed of the image scanner's path directing device 210 causes it to generate lower acoustical noise and vibration and to use less power than a path directing device used on a laser scanner. Other embodiments that use different technologies or improved technologies for the image capture device 205 may have RPMs speeds that are faster or slower to meet the requirements of the imaging technology.

The rotation speed of the path directing device 210 can also be limited by the amount of light being reflected off the box 115. Relatively low levels of reflected light will require either a slower rotation speed or a more sensitive image capture device 205. In some environments, ambient light is sufficient to illuminate the box 115 but other environments require an additional source of light. In some embodiments, a light source, i.e., LEDs, is placed inside the image scanner system 100 so that the light emitted from the LEDs passes through the horizontal and/or vertical scanning windows to illuminate the box 115. The LEDs may operate continuously or they can be timed to pulse so that they illuminate an area as the path directing device 210 directs an image from that area to the image capture device 205. In other embodiments, a light source is placed in the housing of the image scanner system 100 so as to directly illuminate an area.

Figure 3:
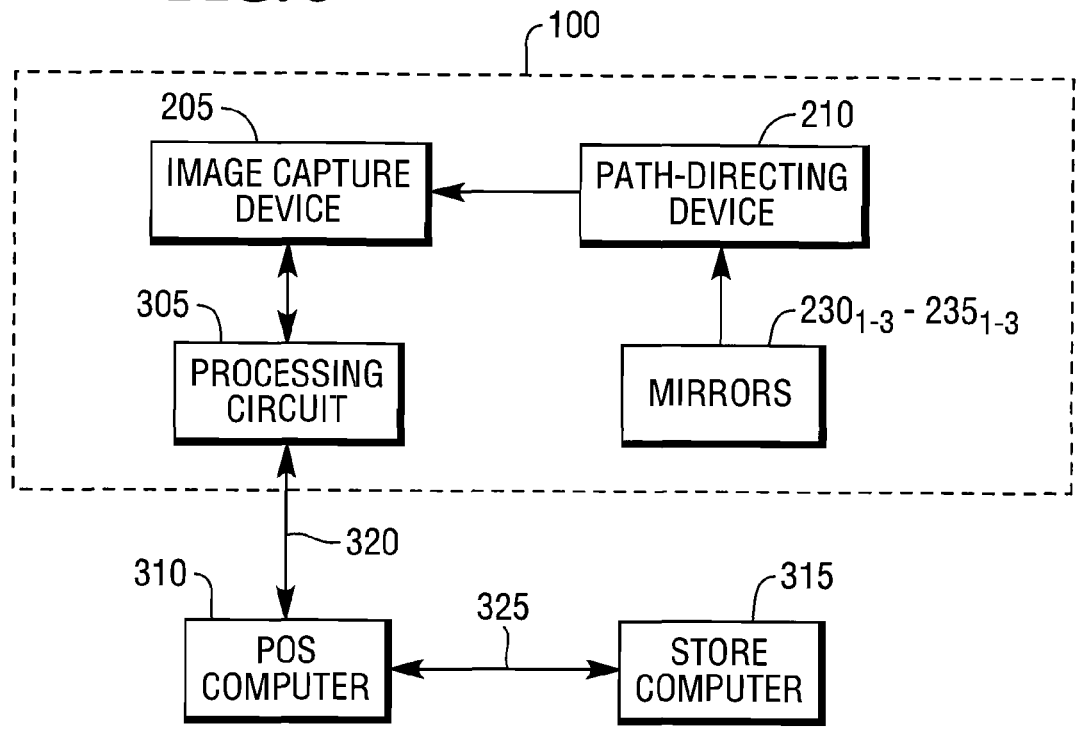
FIG. 3 is a high-level block diagram of an exemplary imaging scanner system.

FIG. 3 is a high-level block diagram of an exemplary image scanner system. The image scanner device 100 includes mirrors $230_{1-3}$, $235_{1-3}$ aligned to direct optical image paths to the path-directing device 210 and then to the image capture device 205. A processing circuit 305 controls the image capture device 205. The processing circuit 305 includes a processor, memory and program code. The program code when executed by the processor causes the processing circuit 305 to issue commands to control the image capture device 205 and to receive and process the images captured by the image capture device 205. When an optical code is detected in an image, the information associated with the optical code is decoded by the processing circuit and sent to a point-of-sale (POS) computer 310. The optical code is a bar code but other embodiments use different types of optical codes such as text, numbers, or symbols. In other embodiments, the processing circuit 305 sends the images to another processing circuit such as the POS computer, which then processes the images to detect an optical code. Still other embodiments do not use the POS computer to process the image but instead use a general-purpose computer or a computer designed to process images. The bar code information is sent a store computer 315, which then looks up information concerning the identified bar code. Information, such as a price, is then sent to the POS computer 310 for display or further use.

Figure 4:
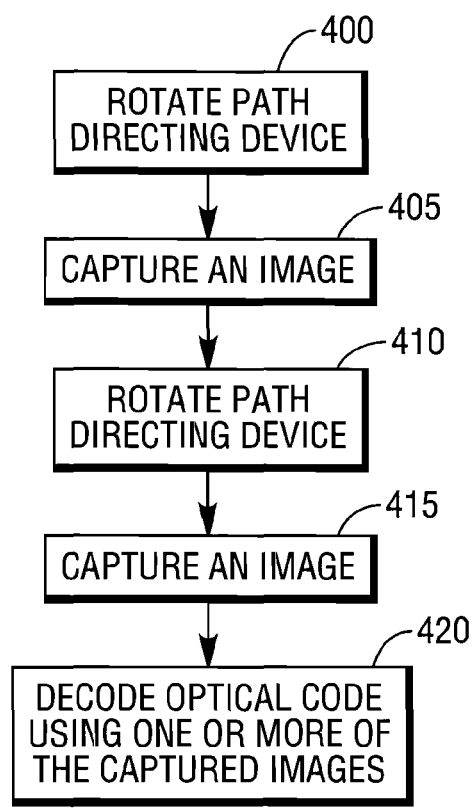
FIG. 4 is high-level flow diagram illustrating an exemplar method for scanning an optical code using an imaging scanner device.

FIG. 4 is a high-level flow diagram illustrating an exemplary method for scanning an optical code using an image scanner device. In step 400, the path directing device 210 rotates to a position where an optical image path is aligned such that an image is reflected off the path directing device 210 to the image capture device 205. In step 405, the processing circuit 305 detects the position of the path directing device 210 and causes the image capture device 205 to capture an image. In step 410, the path directing device 210 rotates to a position where another optical image path is aligned such that an image is reflected off the path directing device 210 to the image capture device 205. In step 415, the processing circuit 305 detects the position of the path directing device 210 and causes the image capture device 205 to capture an image. In some embodiments, a device that detects the position of the path directing device 210 is used to determine the position of the path directing device 210 and thus when to capture an image. In other embodiments, a calibration image is located inside the image scanner device 100 such that an optical image path is directed at the calibration image at least once during the rotation of the path directing device 210. The processing circuit 305 initially detects the position of the path directing device 210 by continuously capturing images until it detects the calibration image. After detecting the calibration image over several rotations of the path directing device 210, the processing circuit 305 is able to determine the speed and position of the path directing device 210 and to predict when the path directing device 210 will be in certain positions causing image paths to align with the image capture device 205. An image of the calibration image is taken periodically to maintain the accuracy of the predicted positions of the path directing device 210. In step 420, the processing circuit 305 decodes an optical code using one or more of the captured images.

Although the disclosed invention has been described with particular reference to certain preferred embodiments thereof, variations and modifications of the disclosed invention can be effected within the spirit and scope of the following claims. For example, in other embodiments, the image scanning device 100 has more than one image capture device and each image capture device has focusing optics that uniquely focus the optical image paths being directed at it. This allows each image capture device to use the same optical image paths but focus at a different distance thus increasing the depth of field. Additionally, some embodiments have more than one path directing device. In some embodiments having multiple path directing devices, one of the path directing devices directs paths from the horizontal window and another path directing device directs paths from the vertical window. In some cases, the path directing devices do not need additional mirrors to help direct the paths.

What is claimed is:

1. A multiple path image scanner apparatus for scanning an optical code, the apparatus comprising:
    an image capture device operable to capture a plurality of images;
    a plurality of mirrors aligned to provide a plurality of optical image paths to a focal plane where the optical image paths pass through the same optical aperture in the scanner;
    a path directing device including a mirrored polygon operable to direct an image from each of the optical image paths to the image capture device, and wherein the path directing device adapted to receive and direct one of the optical image paths without any of the mirrors;
    an image focusing lens between the path directing device and the image capture device where the lens focuses each of the plurality of images on to the image capture device; and
    a processing circuit adapted to cause the image capture device to capture the image from each of the optical image paths and to cause the decoding of the optical code using one or more of the captured images.

2. The apparatus of claim 1, wherein the path directing device is a polygon.

3. The apparatus of claim 2, wherein the path directing device has at least one reflective side.

4. The apparatus of claim 3, wherein the path directing device rotates at or less than 720 RPMS.

5. The apparatus of claim 1, wherein the processing circuit is adapted to detect position information for the path directing device and to use the position information to determine when to cause the image capture device to capture the image.

6. The apparatus of claim 5, wherein the processing circuit uses a calibration image to determine the position of the path directing device.

7. The apparatus of claim 1, wherein the processing circuit is adapted to store one or more of the captured images.

8. The apparatus of claim 1, wherein the optical code includes a bar code.

9. The apparatus of claim 1, wherein the optical code includes alphanumeric text.

10. The apparatus of claim 1, wherein at least one of the plurality of mirrors is aligned so that the optical path extending from the mirror is generally in a vertical direction.

11. The apparatus of claim 1, wherein at least one of the plurality of mirrors is aligned so that the optical path extending from the mirror is generally in a horizontal direction.

12. The apparatus of claim 1, wherein the processing circuit causes the optical code to be decoded by another processing circuit.

13. A method for use in a multiple path image scanner apparatus to scan an optical code, the method comprising:
    rotating a path directing device including a mirrored polygon to a first position to reflect a first image from a first mirror to an image capture device where the first image passes through an optical aperture of the image scanner, wherein the path directing device is rotatable 360 degrees of rotation;
    passing the first image through a lens to focus the first image on the image capture device;
    causing the image capture device to capture the first image;
    rotating the path directing device to a second position to reflect a second image from a second mirror to the image capture device where the second image passes through the optical aperture of the image scanner;
    passing the second image through the lens to focus the second image on the image capture device;
    causing the image capture device to capture the second image; and
    decoding an optical code by processing either or both the first and second images.

14. The method of claim 13, wherein the path directing device is a polygon rotating at or less than 720 RPMs.

15. The method of claim 14, wherein the path directing device has at least one reflective side.

16. The method of claim 13, wherein the optical code includes a bar code.

17. The method of claim 13, wherein the optical code includes alphanumeric text.

18. The method of claim 13, wherein the first mirror is aligned so that the optical path extending from the mirror is generally in a vertical direction.

19. The method of claim 13, wherein the second mirror is aligned so that the optical path extending from the mirror is generally in a horizontal direction.

20. The method of claim 13, further comprising detecting the position of the path directing device.

21. The method of claim 20, further comprising using the position of the path directing device to determine when to cause the image capture device to capture an Image.

22. A multiple path image scanner system for scanning an optical code, the system comprising:
    a server computer adapted to store information associated with the optical code;
    a local computer in communication with the server computer; and
    an image scanner device in communication with the local computer, the device comprising:
        an image capture device operable to capture a plurality of images;

a plurality of mirrors aligned to provide a plurality of optical image paths to a focal plane where the optical image paths pass through the same optical aperture in the scanner;

a path directing device including a mirrored polygon operable to direct an image from each of the optical paths to the image capture device;

an image focusing lens between the path directing device and the image capture device where the lens focuses the each of the plurality of images on to the image capture device; and a processing circuit adapted to cause the image capture device to capture the image from each of the optical paths and to cause the decoding of the optical code using one or more of the captured images, and wherein the processing circuit is further adapted to predict when the path directing device is in positions that cause the optical paths to align with the image capture device.

23. The system of claim 22, wherein the path directing device is a polygon.

24. The system of claim 23, wherein the path directing device has at least one reflective side.

25. The system of claim 24, wherein the path directing device rotates at or less than 720 RPMS.

26. The system of claim 22, wherein the processing circuit is adapted to detect position information for the path directing device and to use the position information to determine when to cause the image capture device to capture the image.

27. The system of claim 22, wherein the processing circuit is adapted to store one or more of the captured images.

28. The system of claim 22, wherein the optical code includes a bar code.

29. The system of claim 22, wherein the optical code includes alphanumeric text.

30. The system of claim 22, wherein at least one of the plurality of mirrors is aligned so that the optical path extending from the mirror is generally in a vertical direction.

31. The system of claim 22, wherein at least one of the plurality of mirrors is aligned so that the optical path extending from the mirror is generally in a horizontal direction.

* * * * *